Sept. 29, 1970          R. D. HOUK          3,530,736
SINGLE LEVER CONTROL
Filed Dec. 13, 1968          4 Sheets-Sheet 2
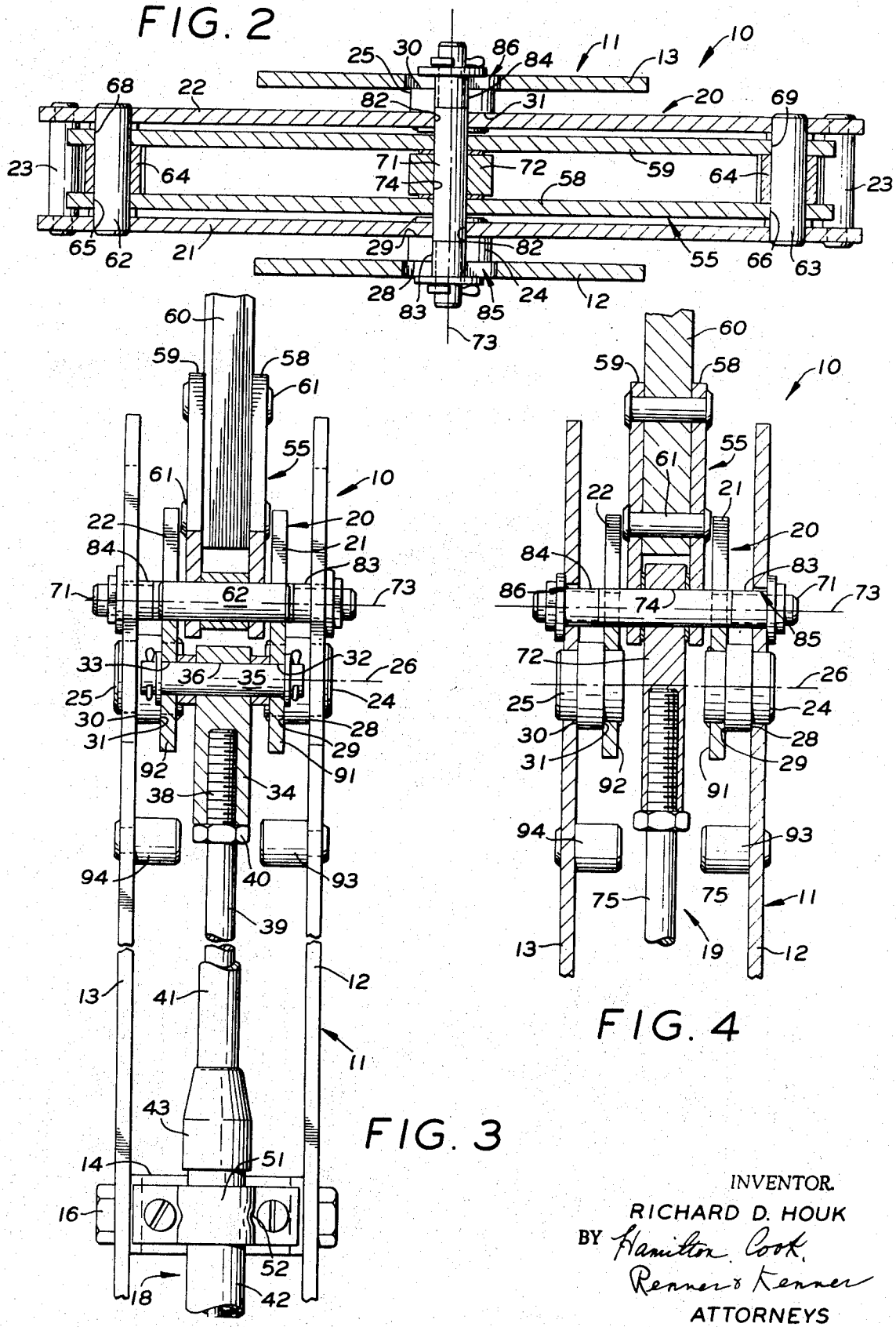
INVENTOR.
RICHARD D. HOUK
BY Hamilton Cook,
Renner & Kenner
ATTORNEYS

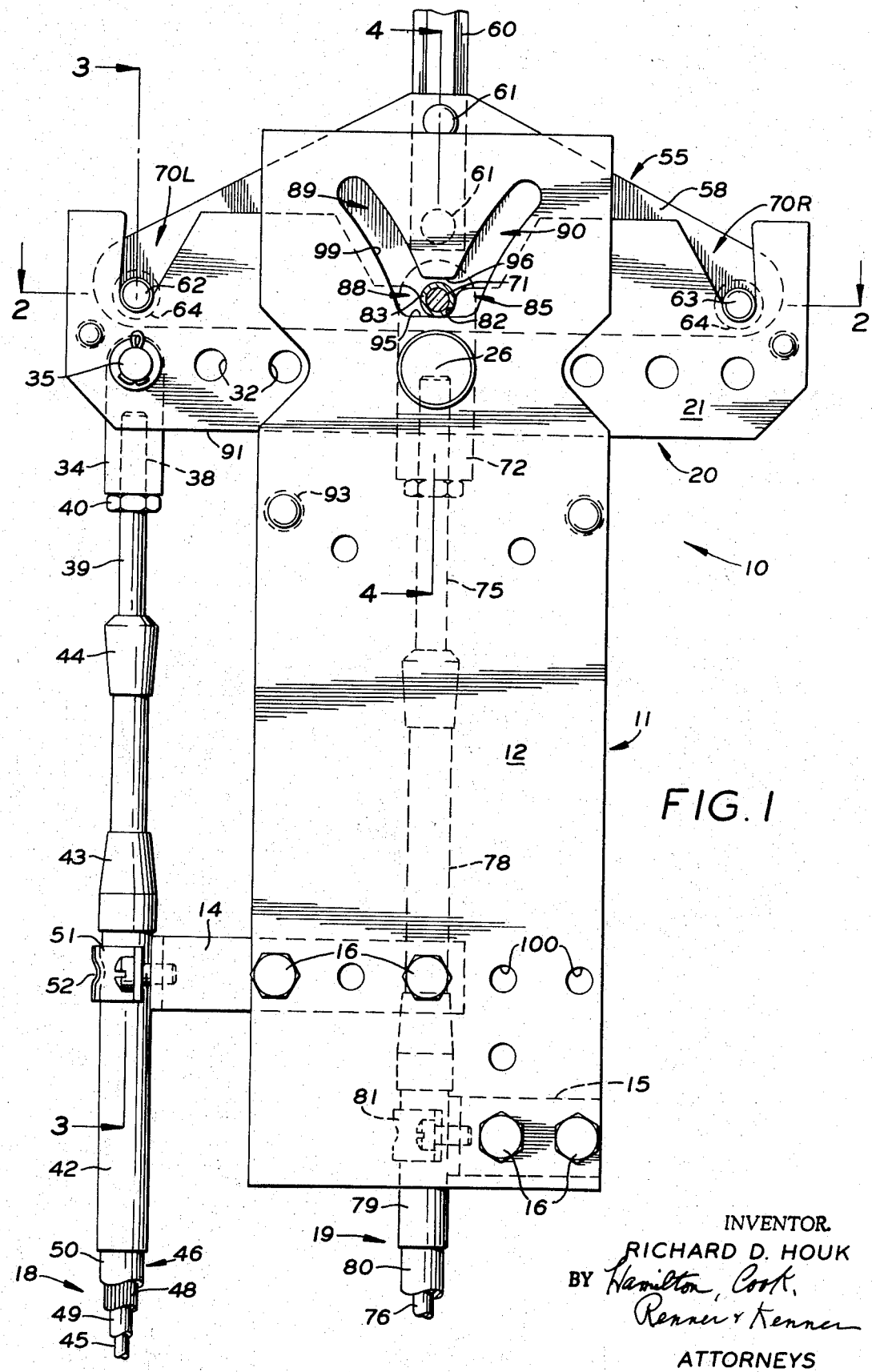

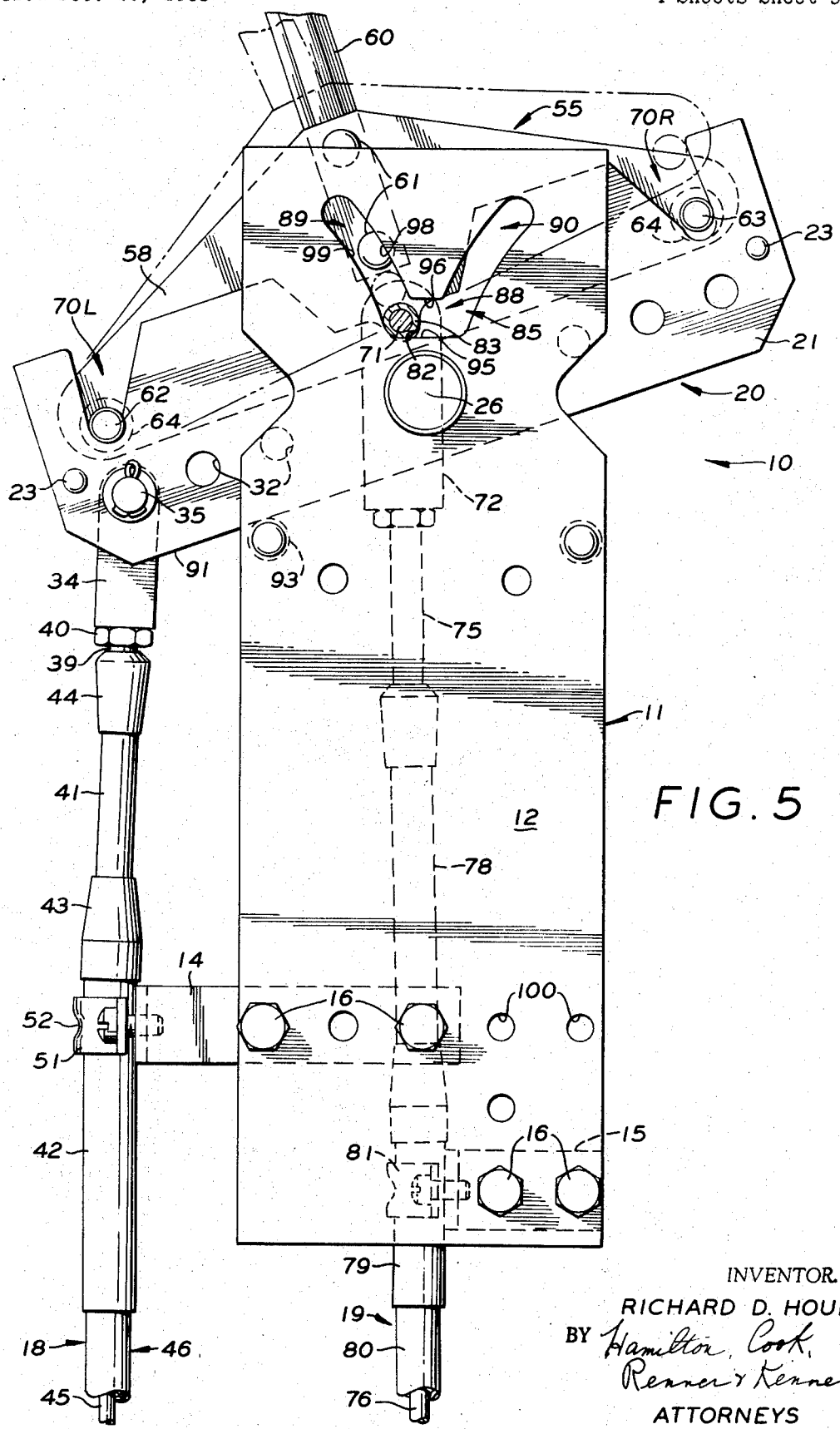

INVENTOR.
RICHARD D. HOUK
BY Hamilton, Cook,
Renner & Kenner
ATTORNEYS

United States Patent Office 3,530,736
Patented Sept. 29, 1970

3,530,736
SINGLE LEVER CONTROL
Richard D. Houk, Stow, Ohio, assignor, by mesne assignments, to North American Rockwell Corporation, Pittsburgh, Pa., a corporation of Delaware
Filed Dec. 13, 1968, Ser. No. 783,521
Int. Cl. G05g 1/00
U.S. Cl. 74—469                                      13 Claims

ABSTRACT OF THE DISCLOSURE

A single lever control for sequential actuation of two force transmitting devices. The control has an oscillating beam mounted on a frame. One of the force transmitting devices is adapted for operation by swinging movement of said oscillating beam with respect to the frame. A rocker arm is swingingly mounted on the oscillating beam, and the second force transmitting device is adapted for operation by swinging movement of the rocker arm with respect to the oscillating beam. The control lever is secured to the rocker arm, and a cam follower on the rocker arm interengages a cam on the frame to assure sequential operation between the force transmitting devices and further to assure that only the reversely directed reaction force transmitting device at a time can be fed back through the control unit to the control lever.

BACKGROUND OF THE INVENTION

A single lever control for sequentially actuating at least two motion transmitting means such as push-pull control cables. Sequential control of multiple motion transmitting devices has gained highly favorable acceptance in the operation of clutch and throttle controls, particularly for marine engines. Single lever control devices of this general nature may also be utilized in other environments wherein controlled sequential operation of multiple elements is required.

One such area of use is in the operation of hydrostatic transmissions. Hydrostatic transmissions for vehicles are not new. They have been utilized as specialty devices for a number of years, but until recently have not been considered practical for commercial use because of cost, size, efficiency and controllability. Recent advances in production techniques have made reliable high pressure hydrostatic components available at a cost competitive with more common means of power transmission. Such hydrostatic transmission units offer numerous distinct advantages, most noteworthy being the absence of gear shift levers and the smooth, stepless availability of infinitely variable power transmission ratios. Additionally, standard hydrostatic transmissions can effectively provide many of the transmission applications which have heretofore only been available as special options, such as creeper drives, torque convertors and fast forward-reverse attachments.

As another consideration, the past several decades have resulted in extensive changes in the design concepts of heavy duty vehicles. Not only has the size of such vehicles been increased considerably but such vehicles are now often multi-powered or even articulated for increased maneuverability. These design changes, with their attended geometric complexity and often remotely located, multiple engines, have made the power train for mechanical transmission devices quite difficult to effect. Again, hydrostatic transmissions are uniquely suited to such installations. However, without a precise control system the advantages of hydrostatic transmissions cannot be fully utilized.

Briefly, hydrostatic transmissions employ a hydraulic pump to operate a hydraulic motor. Both the pump and motor usually utilize multiple pistons oriented axially in spaced relation about the circumference of a circle centered on the rotational axis of the respective pump and motor rotors. A power source rotates the pump rotor and effects reciprocation of the pistons therein against a pump swash plate to force the hydraulic fluid from the pump into the motor. The admission of the hydraulic fluid, under pressure, from the pump into the motor reciprocates the pistons in the latter against a motor swash plate to effect rotation of the motor rotor which is operatively connected to the device to be driven. The displacement per stroke of the pistons in either, or both, the pump and motor may be selectively varied by controlling the inclination of the swash plates with respect to the rotational axes of the respective pump and motor rotors. If the swash plates on both the pump and motor are selectively variable the hydrostatic transmission is referred to as a variable pump-variable motor variety; if only the swash plate on the pump is selectively variable, the hydrostatic transmission is referred to as a variable pump-fixed motor variety.

While selective control of the swash plate inclination has heretofore been attempted by air, hydraulic, electric and mechanical controls, the air, hydraulic and electric controls do not provide the operator with the desirable tactile sensitivity present in mechanical controls, and satisfactory mechanical controls have been limited to use with only the variable pump-fixed motor variety of hydrostatic transmission.

SUMMARY OF THE INVENTION

It is therefore a primary object of the present invention provide a mechanical control unit by which even hydrostatic transmissions of the variable pump-variable motor variety can be accurately phased with tactile sensitivity.

It is another object of the present invention to provide a control unit, as above, which is also readily adapted to operate a mechanical, two spool transmission.

It is still another object of the present invention to provide a control unit, as above, which is also readily adapted sequentially to operate the clutch and throttle of an engine.

It is a further object of the present invention to provide a control system, as above, which sequentially actuates dual force transmitting devices with the degree of dwell available to the second force transmitting device during actuation of the first force transmitting device being preselected.

It is a still further object of the present invention to provide a control system, as above, which provides sequential operation of dual force transmitting devices by actuation of a single lever through only a modest angle of rotation.

It is an even further object of the present invention to provide a control system, as above, in which an interlock is effected to maintain the first force transmitting device against actuation during actuation of the second force transmitting device.

These and other objects which will become apparent from the following specification are accomplished by means hereinafter described and claimed.

In general, a control unit embodying the concept of the present invention is adapted sequentially to actuate two force transmitting devices. If, for example, the force transmitting devices are push-pull cables, the casings may be secured to the frame of the control unit, and the cores would be adapted to be operatively connected to two movable members within the control. One of the cores would be operatively connected to an oscillating beam swingingly mounted on the frame. The second core would be operatively connected to a rocker arm swingingly mounted on the oscillating beam. The control lever is secured to the rocker arm, and sequential operation of the cable core may be assured by a cam follower carried on the rocker arm that interacts with a cam means of the frame to assure that the rocker arm swings with the oscillating beam initially and thereafter with respect to the oscillating beam.

One preferred embodiment, and a variation thereof, is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 1 is a side elevation of a control unit embodying the concept of the present invention depicted with the single control lever in neutral position;

FIG. 2 is a horizontal section taken substantially on line 2—2 of FIG. 1;

FIG. 3 is a vertical section taken substantially on line 3—3 of FIG. 1;

FIG. 4 is a vertical section taken substantially on line 4—4 of FIG. 1;

FIG. 5 is a side elevation similar to FIG. 1 depicting, in solid line, the mechanism of the control, and the control lever, position as it would be upon completion of the actuation of the first motion transmitting device and just prior sequential actuation of the second motion transmitting device and further depicting, in chain line, the mechanism just after actuation of the second motion transmitting device has begun;

DESCRIPTION OF THE PREFERRED EMBODIMENTS

Figures 6, 7:
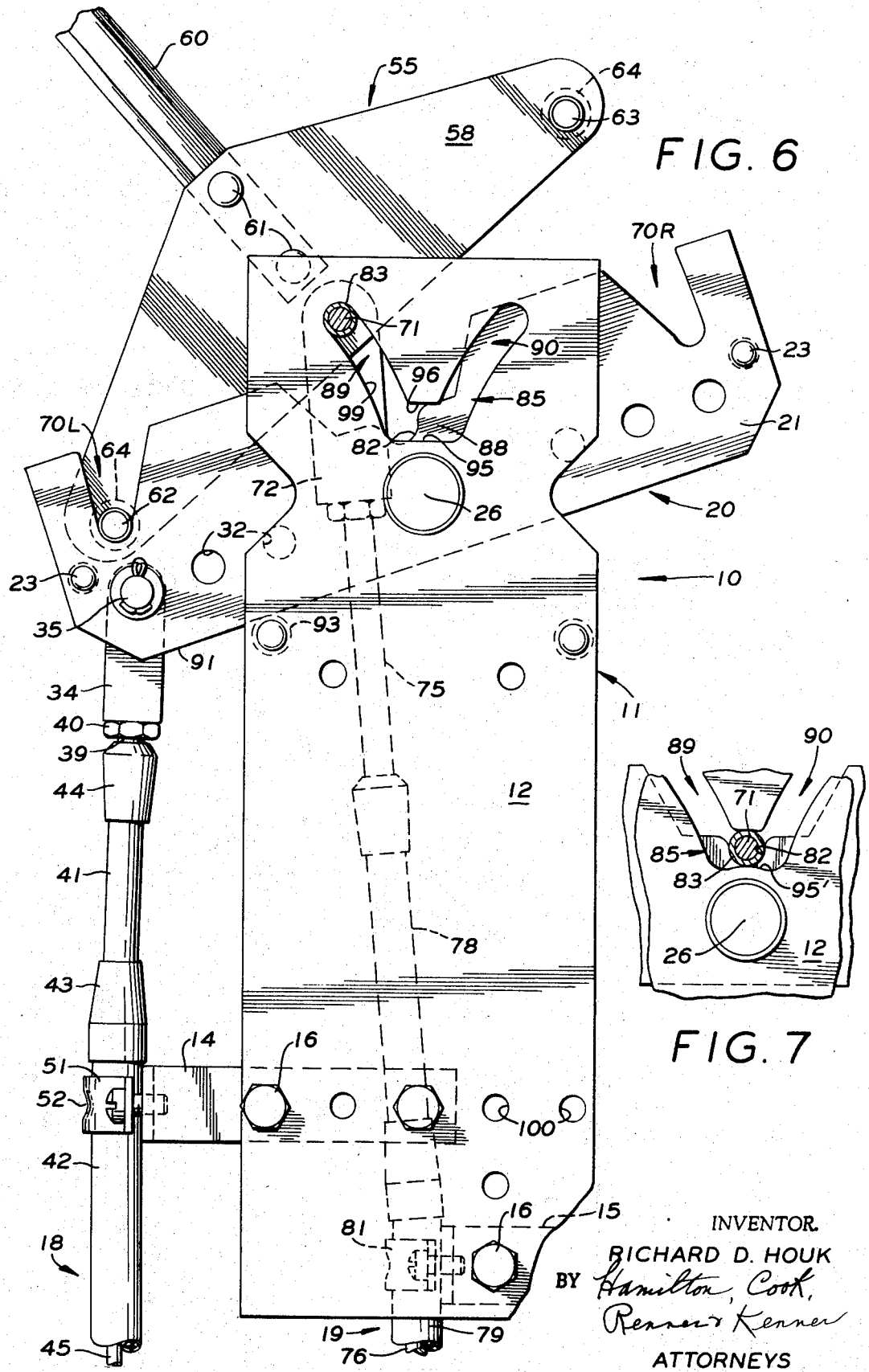
FIG. 6 is a side elevation similar to FIGS. 1 and 5 depicting the mechanism of the control, and the control lever, positioned as it would be upon completion of the sequential actuation of the second motion transmitting device.
FIG. 7 is a partial area of FIG. 1 depicting an alternative form of the cam slot used to provide absolute dwell.

Referring more particularly to the drawings, a control embodying the concept of the present invention is designated generally by the numeral 10. The control 10 has a support frame 11 that may be readily adapted for mounting the control in a location convenient to the operator by conventional means not shown.

The frame 11 generally comprises laterally spaced, frame plates 12 and 13. A pair of brackets 14 and 15 are fastened between the frame plates 12 and 13, as by bolts 16, to assist in the stabilization of the frame plates and to provide mounts for the force transmitting devices 18 and 19.

An oscillating beam 20 is swingingly mounted on the frame 11. As best shown in FIGS. 2 and 4 the oscillating beam 20 may be comprised of a pair of laterally spaced beam plates 21 and 22 interconnected by a pillar 23 at each end. Medially of the oscillating beam 20 a first, shouldered pivot pin 24 extends between the beam plate 21 and frame plate 12, and a second, shouldered pivot pin 25, aligned with the first pin 24, extends between the beam plate 22 and the frame plate 13. The oscillating beam 20 swings about the rotational axis 26 of the pivot pins 24 and 25, and is maintained in spaced relation with respect to the frame plates 12 and 13 by the opposed shoulders on each pivot pin. Pin 24 has a pair of spaced, oppositely directed shoulders 28 and 29. Shoulder 28 engages the frame plate 12 and shoulder 29 engages the beam plate 21 to maintain them in spaced relation. Shoulders 30 and 31 on pivot pin 25 similarly engage and separate frame plate 13 and beam plate 22.

A plurality of holes 32 in beam plate 21 are aligned with a corresponding plurality of holes 33 in beam plate 22 for selective mounting of a swing connector 34, as by clevis pins 35, which is journaled within a bore 36 extending transversely through the head portion thereof (FIG. 3).

The base portion of the swing connector 34 may be bored and tapped to receive the threaded portion 38 of an end rod 39 therein. A lock nut 40 secures the attachment of the end rod 39 to the swing connector 34.

The end rod 39 is slidably received within an extension tube 41 that is gyrationally mounted on an end fitting 42 of the push-pull cable comprising the force transmitting device 18. The gyrational mounting, which is generally a modified ball and socket arrangement, not shown, is preferably protected by the resilient sealing sleeve 43. A similar resilient sealing sleeve 44 is also preferably positioned where the end rod 39 enters the extension tube 41.

The push-pull cable 18 may be of any conventional construction in which the core 45 slidably reciprocates within a casing, indicated generally by the numeral 46, to transmit mechanical motion by the application of either tensile or compressive forces to the core 45. In the exemplary construction depicted, the casing 46 is formed of a plurality of casing wires 48 laid contiguously, in the form of a long pitched helical coil, about the radially outer surface of an inner, flexible, plastic tube 49 which extends the full length of the casing 46. An outer cover 50 encases the coil of wires 48 up to within a short distance from the ends thereof.

The fitting 42 is positioned over the end of the cable casing 46 and is cold swaged, or otherwise suitably connected, onto the exposed portion of the cylindrical grouping of wires 48. A plurality of ribs, not shown, may be provided within the end fitting 42 which, when crimped onto the outer cover 50, effects a seal between the end fitting 42 and cover 50. The end fitting 42 is secured to the bracket 14 by a clamp 51. In the exemplary construction depicted, the clamp 51 is provided with a dimple 52 which interfits with an annular recess, not shown, on the end fitting 42 to assure a fixed location for the end of the cable casing with respect to its own axis.

The end rod 39, which is secured to the cable core 45 in a well-known fashion so as to become, in effect, an extension thereof, is closely received within the extension tube 41. The tube 41 not only guides the rod 39 as it slides therein but also prevents excessive deflection of that portion of the core 45 which slides therein, particularly when subjected to compressive loads.

By supplying a plurality of aligned bores 32 and 33 through the beam plates 21 and 22, respectively, at varied distances from the rotational axis 26 of the oscillating beam 20, one may effect selective axial displacement of the end rod 39 for a given degree of angular rotation by the oscillating beam 20. Similarly, by supplying holes 32 and 33 on both sides of the rotational axis 26, selective connection of the swing connector 34 to the oscillating beam 20 will provide either a push or a pull to the end rod 39 in response to rotation of the oscillating beam 20 in any given direction.

A rocket arm 55 is, in turn, swingingly mounted on the oscillating beam 20. The rocker arm 55, as best seen in FIGS. 2–4, may be comprised of a pair of laterally spaced, generally triangular, side plates 58 and 59 which embrace a control arm 60 that extends upwardly from the medial portion of the plates and to which they are rigidly secured by a pair of rivets 61. A pair of trunnion pins 62 and 63, oriented transversely with respect to rocker arm 55, are spaced outwardly of the control arm 60, one on each side thereof. In order to provide additional stability to the rocker arm 55, a spacer sleeve 64 may be received over each trunnion pin and the side plates 58 and 59 abutted thereagainst with one end of each of the two trunnion pins 62 and 63, respectively, press fit through bores 65 and 66 in side plate 58. Bores 65 and 66 are aligned with corresponding bores 68 and 69 in side plate 59 through which the opposite end of each of the two trunnion pins are press fitted. The outer ends of the trunnion pins 62 and 63 extend laterally beyond the side plates 58 and 59 of the rocker arm 55 and are journaled in a pair of saddles 70R and 70L provided in each of the two beam plates 21 and 22.

Medially of the rocker arm 55, and in proximity to the rotational axis 26 of the oscillating beam 20, a spindle 71 extends between the side plates 58 and 59 of the rocker arm 55 and supports a second connector 72 which is mounted to swing about the axis 73 of the spindle 71. Specifically, the spindle 71 is journaled in a bore 74 extending transversely through the head portion of the swing connector 72. The base portion of the connector 72 is bored and tapped similarly to connector 34 to receive the threaded end portion of end rod 75 therein. The end rod 75 is secured, in a well-known fashion, to the core 76 of a push-pull control cable comprising the second force transmitting device 19 so as to become, in effect, an extension thereof. The end rod 75 is slidably received in an extension tube 78 gyrationally mounted on an end fitting 79 secured to the casing 80 of the push-pull force transmitting cable 19. The end fitting 79 is, in turn, secured to bracket 15 by a clamp 81.

The spindle 71 preferably extends transversely beyond the rocker arm 55 (to which it is preferably secured), across at least one plate of the oscillating beam 20 and through the adjacent frame plate of frame 11.

The upper, medial portions of the beam plates 21 and 22 are recessed to permit the spindle 71 to swing clear thereof when the rocker arm 55 is swung about either trunnion pin 62 or 63, as will be hereinafter more fully described, but the base of the recess is preferably provided with a cradle notch 82 to center the spindle 71 at least when the control unit 10 is in the neutral position depicted in FIG. 1. By thus centrally positioning the spindle 71, the cradle notch 82 serves to locate the rocker arm 55 with respect to the oscillating beam 20 when the control is at, or near, neutral position. Accordingly, this simplified structure reduces the manufacturing tolerances that would be required should such centering required to be effected solely by the interengagement of the trunnion pins 62 and 63 on rocker arm 55 within the two, widely spaced saddles 70R and 70L on oscillating beam 20. Accurate centering is reflected by the feel of the control to the operator; without such centering the control presents a sloppy feel induced by any play between the rocker arm 55 and oscillating beam 20. Centering eliminates this play and provides a firm feel to the movement of the lever 60.

Laterally beyond the beam walls 21 and 22 of the oscillating beam 20, the transversely extending spindle 71 presents cam follower means. In the preferred embodiment, wherein the spindle 71 extends transversely of the rocker arm 55 in two directions, a pair of rollers 83 and 84 are mounted on opposite sides of the spindle. These rollers 83 and 84 pierce cam slots 85 and 86, in the frame plates 12 and 13, respectively, and follow the surfaces thereof with minimal wear.

Each cam slot 85 and 86, is of generally horn-like configuration having a dwell portion 88 medially of two, upwardly and outwardly arched wing portions 89 and 90 that are arcuate about trunnion pins 62 and 63, respectively.

The functional aspect of the cam slots 85 and 86 are best appreciated by an understanding of the operation of control 10. In the neutral position depicted in FIG. 1, the push-pull force transmitting cables 18 and 19 are both unactuated, and the remote mechanisms to which they are attached are, with respect to control 10, also therefore in neutral. Rotation of the control level 60 from the FIG. 1 to the FIG. 5 position encompasses the full control range available to the first push-pull cable 18, and this range is accomplished without actuating, or at least with other controlled actuation of, the second push-pull cable 19. That is, as the oscillating beam 20 swings about rotational axis 26 from its horizontal orientation, depicted in FIG. 1, to its fully inclined position, represented by FIG. 5 (at which point the lower surfaces 91 and 92 of beam plates 21 and 22 engage stop pins 93 and 94, respectively, mounted on frame 11) the core 45 is fully moved with respect to casing 46 in such a direction that force transmission is by way of compression. Should the control 10 be employed sequentially to actuate the clutch and throttle of an engine or a twin spool mechanical transmission, the FIG. 5 position would represent the end of either the forward or reverse shift range. Should the control 10 be employed to phase a hydrostatic transmission, FIG. 5 would represent the fully stroked position of the hydraulic pump—i.e., the swash plate on the pump would have been moved through its complete displacement range.

With the riding surface 95 in the dwell portion 88 of the cam slot being linear (horizontal as shown in FIGS. 1 and 5, or, more generally, tangentially spaced, radially of the rotational axis 26) as the oscillating beam 20 achieves the FIG. 5 position, the spindle 71 will be lifted slightly from the base of cradle notch 82 and trunnion pin 63 will also be lifted a concomitant distance out of the saddle 70R (that depicted on the right, as viewed in FIGS. 1, 5 and 6 as well as the one in alignment therewith on beam plate 22). This movement will slightly lift the swing connector 72 to begin withdrawal of the end rod 75 from the extension tube 78. This movement tends to minimize any backlash that might exist in the push-pull force transmitting cable 19 so that subsequent movement of control lever 60 will induce an immediate actuation of the mechanism operated by cable 19. Minimization of the backlash in this way would be highly desirable if, for example, cable 19 were connected to actuate the pintle that operates the swash plate of the hydraulic motor in the aforementioned hydrostatic transmission.

Should, however, the control 10 be operated in an environment wherein no axial motion should be imparted to the end rod 75, the riding surface 95′ may be of arcuate configuration about the rotational axis 26 of the oscillating beam 20, as depicted in FIG. 7. It must be appreciated that by altering the configuration for the riding surface the degree of dwell may be preselected.

It should also be appreciated that any reaction, or reverse, pressure applied by the core 76 and the end rod 75 against the spindle 71 will not be permitted to lift the rocker arm 55 because of the stop surface 96 that opposes the riding surface 95 in the dwell portion 88 of the cam slots 85 and 86.

Further movement of the control arm 60 beyond the neutral and beyond the position depicted in FIG. 5 (e.g., to the chain line representation therein) will cause the rocker arm 55 to rotate about trunnion pin 62. As soon as the follower portion of spindle 71 moves from the dwell portion 88 into the wing portion 89 any tendency of the oscillating beam 20 to retro-rotate because of back pressure applied by the core 45 and end rod 39, will be precluded by the interaction of the follower portion of the spindle 71 against the locking surface 98 of the wing portion 89. This can be an important feature in controls for hydrostatic transmissions, particularly for those hydrostatic transmissions constructed so that positive pressure is required against the pintle to maintain the swash plate of the pump in stroked position. In the event that core 45 exerts no back pressure, the interengagement of the follower portion of spindle 71 with the lift surface 99 in wing portion 89 will assist extraction of rod 75 from extension tube 78 as the rocker arm 55 rotates about trunnion pin 62 journaled in saddle 70L.

The configuration of the locking surface 98 will also prevent the oscillating beam 20 from swinging except when the spindle 71 is within the dwell portion 88 of the cam slots 85 and 86. As such, if the control 10 is being used to operate a two spool mechanical transmission or sequentially to operate the clutch and throttle of an engine, this configuration makes an effective interlock.

Rotation of the control lever 60 from the FIG. 5 to the FIG. 6 position encompasses the full control range available to the second push-pull cable 19 without actuating the first push-pull cable 18.

It should now also be apparent that the full range of movement required by the control lever 60 in order sequentially, and fully, to actuate both push-pull cables 18 and 19 is represented by the difference between the position of control lever 60 depicted in FIG. 6 as compared to the position of the control lever 60 depicted in FIG. 1. This is a far lesser angular range than that required by controls embodying prior art concepts and makes the subject control particularly well suited for mounting in locations where only a limited swing of the control lever can be tolerated.

Retro-rotation of control lever 60 from the FIG. 6 position through the FIG. 5 position and back to the FIG. 1, or neutral position, sequentially reverses the operation described above, and continued rotation in that direction beyond neutral would reverse the direction that core 45 moves with respect to casing 46 (force transmission would be by tension rather than compression). However, even if the lever 60 is moved in the reverse direction after the core 45 has been moved through its full range, the core 76 will be moved, with respect to the casing 80, in the same direction (force transmission would be by tension) as when the lever 60 was moved from the FIG. 5 toward the FIG. 6 position. As suggested previously, should it be desired that the motion of the core 45 in response to a given directional movement of lever 60 be reversed, the position of bracket 14 may be reversed on frame 11—bores 100 being provided to receive bolt 16 for this purpose—and the swing connector 34 would accordingly be connected to the oscillating beam 20 on the side of the rotational axis 26 opposite to that depicted in FIG. 1.

It must be pointed out that whereas the interaction of the cam follower portion of spindle 71 with the cam slots 85 and 86 assures that the rocker arm 58 will swing with the oscillating beam 20 during the first portion of movement of the control lever 60 in either direction from neutral and thereafter that the rocker arm 55 will swing with respect to the oscillating beam 20, it may well be that the installation environment of the control unit may itself assure such sequential operation. An example of this condition would be the situation where the load on core 76 would far exceed the load on core 45. As such, the movement of lever 60 would inherently move core 45 and sequentially thereafter, core 76. However, to assure the desired sequential movement, the use of a cam means is preferred.

A control embodying the concept of the present invention thus accomplishes the objects thereof.

I claim:

1. A single lever control for sequential actuation of at least two force transmitting devices, said control comprising, a frame, an oscillating beam, first pivot means having a rotational axis oriented transversely of said oscillating beam and connecting said oscillating beam to said frame for swinging movement of said oscillating beam about the rotational axis of said first pivot means, means for operatively connecting the first of the force transmitting devices to said oscillating beam, a rocker arm, second pivot means also having at least one rotational axis oriented transversely of said oscillating beam and spaced from the axis of said first pivot means to connect said rocker arm to said oscillating beam for swinging movement of said rocker arm with respect to said oscillating beam about the rotational axis of said second pivot means, means for operatively connecting the second of the force transmitting devices to said rocker arm, and a control lever, said control lever secured to said rocker arm.

2. A single lever control, as set forth in claim 1, in which cam means are provided to assure that the rocker arm will be swingable with, and, selectively, with respect to, the oscillating beam.

3. A single lever control for sequential actuation of at least two force transmitting devices, said control comprising, a frame, an oscillating beam swingingly mounted on said frame, means for operatively connecting the first of the force transmitting devices to said oscillating beam, a rocker arm, said rocker arm swingingly mounted on said oscillating beam, means for operatively connecting the second of the force transmitting devices to said rocker arm, a control lever, said control lever secured to said rocker arm, and a cam means provided in said frame and a follower means carried by said rocker arm, the interaction of said follower means with said cam means assuring that the rocker arm will swing with, and, selectively, with respect to, said oscillating beam.

4. A single lever control, for sequential actuation of at least two force transmitting devices, said control comprising, a frame, an oscillating beam swingingly mounted on said frame, means for operatively connecting the first of the force transmitting devices to said oscillating beam, said oscillating beam presenting spaced saddles, a rocker arm, said rocker arm presenting spaced, laterally extending trunnion pins, said trunnion pins being rotatably received in said saddles swingingly to support the rocker arm on said oscillating beam, means for opratively connecting the second of the force transmitting devices to said rocker arm, and a control lever, said control lever secured to said rocker arm.

5. A single lever control, as set forth in claim 4, in which the trunnion pins are spaced from said control lever, one on each side thereof.

6. A single lever control, as set forth in claim 4, in which the oscillating beam swings about a transverse rotational axis medially of the oscillating beam and the means for operatively connecting said second force transmitting device to said rocker arm is attached to said rocker arm in proximity to the rotational axis of said oscillating beam.

7. A single lever control, as set forth in claim 6, in which the trunnion pins are spaced from the rotational axis of said oscillating beam, one on each side thereof.

8. A single lever control, as set forth in claim 7, in which a cam means is provided in said frame and a follower means is carried by said rocker arm, the interaction of said follower means with said cam means assuring that the rocker arm will swing with, and, selectively, with respect to, the oscillating beam.

9. A single lever control, as set forth in claim 8, in which the cam means has a dwell portion and a linear riding surface in said dwell portion, said riding surface being tangentially spaced radially of the rotational axis of said oscillating beam to provide selective movement of said rocker arm with respect to said oscillating beam while the oscillating beam swings with respect to said frame.

10. A single lever control, as set forth in claim 8, in which the cam means has a dwell portion and an arcuate riding surface in said dwell portion, said riding surface being arcuate about the rotational axis of said oscillating beam to preclude independent movement of said rocker arm with respect to said oscillating beam when said oscillating beam swings with respect to said frame.

11. A single lever control, as set forth in claim 8, in which the cam means has two arched wing portions extending arcuately outwardly from a medial dwell portion, said wing portions being arcuate about the trunnion pins provided on said rocker arm.

12. A single lever control, as set forth in claim 11, in which the rocker arm carries a transverse spindle for attaching the second force transmitting device to said rocker in proximity to the rotational axis of said oscillating beam, said follower means presented on the spindle laterally of said rocker arm.

13. A single lever control, as set forth in claim 12, in which the oscillating beam is provided with a cradle notch to center the spindle when the trunnion pins are received in said saddles.

References Cited

UNITED STATES PATENTS

| | | | |
|---|---|---|---|
| 2,967,436 | 1/1961 | Steinlein | 74—471 |
| 3,388,609 | 6/1968 | Miller | 74—471 |

MILTON KAUFMAN, Primary Examiner

U.S. Cl. X.R.

74—741, 876; 192—.098

PO-1050
(5/69)

UNITED STATES PATENT OFFICE
CERTIFICATE OF CORRECTION

Patent No. 3,530,736          Dated September 29, 1970

Inventor(s) RICHARD D. HOUK

It is certified that error appears in the above-identified patent and that said Letters Patent are hereby corrected as shown below:

Column 1, line 25, after "force" insert -- in one force --.

Column 1, lines 38 and 39, change "elecments" to -- elements --.

Column 2, line 41, before "provide" insert -- to --.

Column 3, line 19, change "of" to -- on --.

Column 3, line 43, change "position" to -- positioned --.

Column 4, line 74, change "rocket" to -- rocker --.

Column 6, line 14, change "other" to -- only --.

Column 8, line 40, change "opratively" to -- operatively --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents